US007841521B2

(12) United States Patent
Silva et al.

(10) Patent No.: US 7,841,521 B2

(45) **Date of Patent: *Nov. 30, 2010**

(54) ELECTRONIC IMAGE ACQUISITION FOR GAMING SYSTEMS

(75) Inventors: Robert Silva, Reno, NV (US); Chris Lundy, Reno, NV (US); Jason Kremer, Reno, NV (US); Garrett Olson, Reno, NV (US)

(73) Assignee: IGT, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 11/964,655

(22) Filed: Dec. 26, 2007

(65) Prior Publication Data

US 2008/0099555 A1 May 1, 2008

Related U.S. Application Data

(63) Continuation of application No. 10/898,600, filed on Jul. 22, 2004, now Pat. No. 7,331,520.

(51) Int. Cl.
*G06F 7/08* (2006.01)

(52) U.S. Cl. ........................................................ 235/381

(58) Field of Classification Search .................. 235/381
See application file for complete search history.

(56) References Cited

U.S. PATENT DOCUMENTS 5,483,049 A * 1/1996 Schulze, Jr. .................. 705/14
5,676,231 A 10/1997 Legras et al.
5,818,019 A 10/1998 Irwin, Jr. et al.

(Continued)

FOREIGN PATENT DOCUMENTS

DE 4006514 9/1990

(Continued)

OTHER PUBLICATIONS

PCT Invitation to Pay Additional Fees, with a Partial International Search Report, mailed Dec. 22, 2005, from corresponding International Application No. PCT/US2005/025886.

(Continued)

*Primary Examiner*—Seung H Lee
*Assistant Examiner*—Tae Kim
(74) *Attorney, Agent, or Firm*—Weaver Austin Villeneuve & Sampson LLP

(57) ABSTRACT

Methods and devices are provided for making, storing and retrieving electronic representations of payment documents such as payment tickets used for gaming machines. Some implementations sort currency and non-currency payment documents. According to some embodiments, electronic representations are made only of non-currency payment documents. After an electronic representation of a non-currency payment document is made, the payment document is preferably voided. Voided payment documents may be stored in a non-secure storage area, may be automatically disposed of, or may simply be ejected. Some implementations provide devices and methods for resolving payment disputes by reference to stored electronic representations of payment documents. Other embodiments read information from a payment document and make an electronic representation of the payment document without retaining the payment document. Voiding information is transmitted to, e.g., a host device and/or a gaming machine in order to prevent re-use of a payment document.

18 Claims, 10 Drawing Sheets

U.S. PATENT DOCUMENTS

| | | | | |
|---|---|---|---|---|
| 6,758,393 | B1 | 7/2004 | Luciano et al. | |
| 2002/0020603 | A1 | 2/2002 | Jones et al. | |
| 2002/0145035 | A1 | 10/2002 | Jones | |
| 2003/0141359 | A1 | 7/2003 | Dymovsky et al. | |
| 2004/0016797 | A1 * | 1/2004 | Jones et al. | 235/379 |
| 2004/0129773 | A1 | 7/2004 | Lute, Jr. et al. | |

FOREIGN PATENT DOCUMENTS

| | | |
|---|---|---|
| WO | WO 91/10216 | 7/1991 |

OTHER PUBLICATIONS

International Search Report, dated Feb. 27, 2006 from corresponding International Application No. PCT/US2005/025886, 8 pp. including Notification of Transmittal.

Written Opinion of the International Searching Authority, dated Feb. 27, 2006 from corresponding International Application No. PCT/US2005/025886, 8 pp.

U.S. Office Action mailed Dec. 20, 2004, from U.S. Appl. No. 10/898,600.

U.S. Office Action mailed Jun. 6, 2005, from U.S. Appl.No. 10/898,600.

U.S. Office Action mailed Aug. 19, 2005, from U.S. Appl. No. 10/898,600.

U.S. Office Action mailed Dec. 9, 2005, from U.S. Appl. No. 10/898,600.

U.S. Office Action mailed Jun. 5, 2006, from U.S. Appl. 10/898,600.

U.S. Office Action mailed Aug. 23, 2006 from U.S. Appl. No. 10/898,600.

U.S. Office Action mailed Nov. 30, 2006 from U.S. Appl. No. 10/898,600.

U.S. Office Action mailed May 17, 2007 from U.S. Appl. No. 10/898,600.

Notice of Allowance and Notice of Allowability mailed Sep. 26, 2007 from U.S. Appl. No. 10/898,600.

* cited by examiner

ELECTRONIC IMAGE ACQUISITION FOR GAMING SYSTEMS

CROSS-REFERENCE TO RELATED APPLICATION

This application is a continuation of U.S. patent application Ser. No. 10/898,600, entitled "ELECTRONIC IMAGE ACQUISITION FOR GAMING SYSTEMS" and filed on Jul. 22, 2004 now U.S. Pat. No. 7,331,520, which is hereby incorporated by reference and for all purposes.

BACKGROUND OF THE INVENTION

1. Field of the Invention

This invention relates to payment validators. More particularly, the present invention relates to payment validators into which a user can insert a payment document such as a ticket or currency, thereby obtaining credit for gaming.

2. Description of Related Art

Many machines now employ payment validators, commonly known as "bill acceptors" or "bill validators," which accept payment documents such as currency or cashless tickets. The terms "payment validator," "bill acceptor" and "bill validator" will be used interchangeably herein. The bill validator includes a feeder or a similar device for allowing a user to introduce the payment document into the bill validator. The bill validator also includes one or more devices for evaluating the type and/or denomination of the payment document. For example, some bill validators include devices for recognizing patterns that are characteristic of, e.g., a $20 bill.

As will be appreciated by those familiar with the gaming industry, bill validators have been added to a number of different gaming machines (such as slot machines, video poker machines, etc.). Special precautions must be taken when removing payment documents from gaming machines. It is not uncommon for slot machines to store upwards of $20,000 between collection cycles. To maintain the necessary security, it has become increasingly common to store payment documents collected by a bill acceptor in a secure "collection box" (sometimes referred to as a "cash box") that cannot be accessed by maintenance people working on the bill validator.

In addition, it has become common in the industry to provide two dedicated cash boxes for each bill validator, only one of which is disposed within a gaming machine at one time. A cash box is typically secured behind a main door of a gaming machine. When a first one of the cash boxes is collected, a second empty one of the cash boxes is installed in its place and the first cash box is delivered to the counting center. In this manner, substantial security is provided. The cash boxes are locked such that they may not be opened by the person responsible for collecting the cash boxes, unless that person has a key. Typically, the keys to the cash box are not given to the person collecting the cash box, but rather, are given to authorized personnel in a dedicated counting center.

Another drawback of prior art bill validators for the gaming industry is that the gaming machine must be opened in order to remove the collection box. In order to create the necessary level of security, opening a gaming machine is a labor-intensive process, normally involving a technician and two security guards. This procedure provides access to all the inner workings of the gaming machine. Thus, it is quite possible that a collection worker could accidentally or maliciously tamper with various machine electronics and other sensitive instrumentation. The more times that the collection box needs to be accessed, the greater the labor costs and the more opportunities there are for tampering with a gaming machine or stealing payment documents. Therefore, it would be desirable to provide a system for reducing the frequency of access to gaming machines' collection boxes.

Moreover, disputes sometimes arise with customers regarding payment documents used for gaming. Some customers may attempt to use a payment document to obtain more playing credits than are authorized, e.g. by pulling out a partially-introduced payment document, by making duplicate payment documents, etc. Other customers may claim that a gaming machine has not provided the proper credit for the customer's payment document(s). Therefore, it would also be desirable to provide methods and devices to more conveniently resolve disputes with gaming customers regarding payment documents.

SUMMARY OF THE INVENTION

Methods and devices are provided for making, storing and retrieving electronic representations of payment documents such as payment tickets used for gaming machines. Some implementations sort currency and non-currency payment documents. According to some embodiments, electronic representations are made only of non-currency payment documents. After an electronic representation of a non-currency payment document is made, the payment document is preferably voided. Voided payment documents may be stored in a non-secure storage area, may be automatically disposed of, or may simply be ejected. Some implementations provide devices and methods for resolving payment disputes by reference to stored electronic representations of payment documents. Other embodiments read information from a payment document and make an electronic representation of the payment document without retaining the payment document. Voiding information is transmitted to, e.g., a host device and/or a gaming machine in order to prevent re-use of the payment document.

Some embodiments of the invention provide a payment validation device for a gaming machine. The payment validation device includes: a feeder for receiving a payment document; an image-capturing device for making an electronic representation of the payment document; a logic device configured to evaluate the payment document and transmit payment document information to a gaming machine; and a voiding device configured for voiding the payment document.

The payment validation device may include a sorting device for sorting currency payment documents from non-currency payment documents. In some embodiments, the scanner makes an electronic representation of the non-currency payment documents but does not make an electronic representation of the currency payment documents.

The image-capturing device may include, for example, a charge-coupled device, a camera or a scanner. The electronic representation may include a digital image of the payment document or data for reconstructing an image of the payment document.

The payment document information transmitted to the gaming machine comprises an authorization of a specific monetary amount. The sorting device may route the currency payment documents to a secure collection box and route the non-currency payment documents to the voiding device. Voided payment documents may be routed to a non-secure location. The voiding device may be configured to void the payment document by, for example, shredding, heating or overprinting. The payment validation device may include an ejector for ejecting voided payment documents.

Some implementations of the present invention provide a method for processing payment documents for gaming. The method includes the following steps: receiving a payment document; making an electronic representation of the payment document; transmitting the electronic representation to a host device; determining whether the payment document is valid; transmitting authorization information to a gaming machine; and voiding the payment document. The authorization information may include a monetary authorization for gaming.

The step of determining whether the payment document is valid may involve receiving validation information from the host device. The voiding step may involve shredding, heating or overprinting the payment document.

The method may involve placing voided payment documents in a non-secure location. Voided payment documents from a plurality of gaming machines may be placed into a common location. If a payment document is received at a gaming machine, the method may include the step of removing voided payment documents without opening the gaming machine. The method may involve ejecting voided payment documents and/or automatically collecting voided payment documents for disposal.

Some aspects of the invention provide a method for resolving payment disputes for gaming. The method includes the steps of retrieving image data corresponding to payment documents received by a gaming machine and displaying the image data. The retrieving step may involve retrieving image data corresponding to the last N payment documents received by the gaming machine and/or retrieving image data corresponding to payment documents received by the gaming machine within a specified period of time. The retrieving step may involve searching a database of global image data corresponding to payment documents received by a plurality of gaming machines.

Some implementations of the invention provide a computer program stored in a machine-readable medium. The computer program includes instructions for performing at least one of the methods described herein.

Still other embodiments of the invention provide a device for resolving payment disputes for gaming. The device includes: an input device for receiving instructions from a user; at least one port for communicating with a host device; a logic device configured to retrieve image data from the host device, the image data corresponding to payment documents received by a gaming machine; and a screen for displaying the image data, according to commands from the logic device. The device may be a hand-held device, a laptop computer, a desktop computer, etc.

The logic device may be configured to retrieve image data corresponding to a last N payment documents received by the gaming machine and wherein N is a number indicated by a user via the input device. The logic device may also be configured to retrieve image data corresponding to payment documents received by the gaming machine within a period of time specified by a user via the input device. The logic device may be configured to retrieve the image data by searching in a database comprising global image data corresponding to payment documents received by a plurality of gaming machines. A user may indicates the gaming machine via instructions from the input device.

Yet other embodiments of the invention provide a payment validation device for a gaming machine. The payment validation device includes: a surface for positioning a payment document; an image-capturing device for making an electronic representation of the payment document when the payment document is positioned on the surface; and a logic device. The logic device is configured to evaluate the payment document, transmit payment document information to a gaming machine and transmit the electronic representation and voiding information regarding the payment document to a host device. The payment document information may be determined from the electronic representation.

The payment validation device may include a reading device for reading the payment document information from the payment document. The reading device may include, for example, an RFID receiver and/or a bar code scanner.

Other embodiments of the invention provide a payment validation device for a gaming machine. The payment validation device includes: an image-capturing device for making an electronic representation of a payment document; an indicator for making an indication of when the payment document is in a position suitable for making the electronic representation; and a logic device. The logic device is configured to do the following: determine when the payment document is in a suitable position for making the electronic representation; control the indicator to make the indication when the payment document is in the suitable position; control the image-capturing device to make the electronic representation when the payment document is in the suitable position; evaluate the payment document; transmit payment document information to a gaming machine; and transmit the electronic representation and voiding information regarding the payment document to a host device. The payment document information may be determined from the electronic representation.

The payment validation device may include a reading device for reading the payment document information from the payment document. The reading device may include, e.g., an RFID receiver and/or a bar code scanner.

Some embodiments of the invention provide a gaming machine that includes any of the previously-described payment validation devices. Still other embodiments of the invention provide a gaming machine, including: a feeder for receiving a payment document; an image-capturing device for making an electronic representation of the payment document; a logic device configured to evaluate the payment document and transmit payment document information to a gaming machine; a voiding device configured for voiding the payment document; a receptacle for collecting voided payment documents; and a port configured for accessing the receptacle without opening another portion of the gaming machine.

Still further embodiments of the invention provide a system for resolving payment disputes. The system includes a network device, a host machine and a payment resolution apparatus. The host machine includes: a feeder for receiving a payment document; an image-capturing device for making an electronic representation of the payment document; and a first logic device configured to evaluate the payment document and transmit payment document information to the network device. The payment resolution apparatus includes: an input device for receiving instructions from a user; at least one port for communicating with the network device; a second logic device configured to retrieve image data from the network device, the image data corresponding to payment documents received by the host machine; and a screen for displaying the image data according to commands from the second logic device. The host machine may be a gaming machine.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Figure 1:
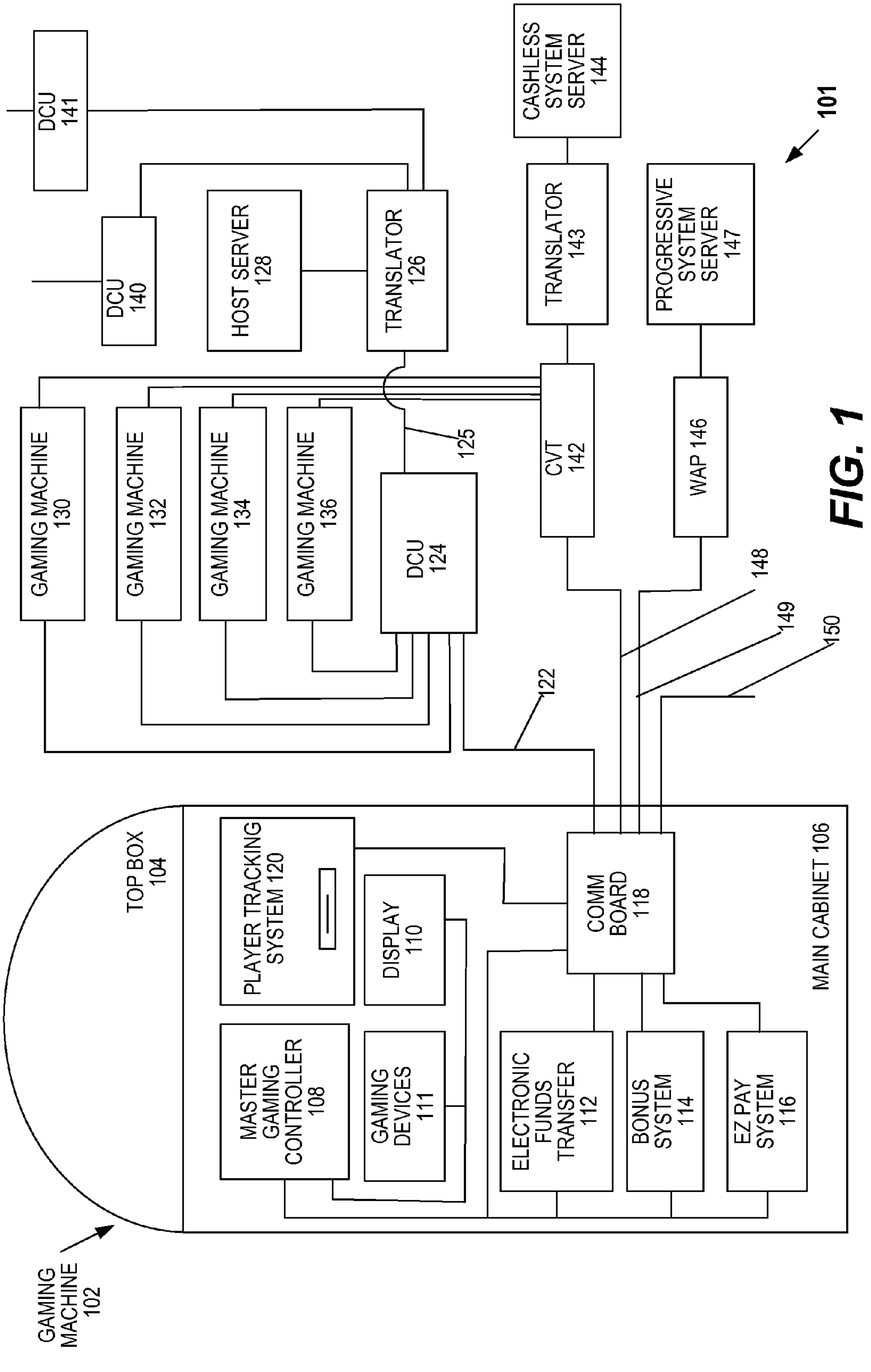
FIG. 1 depicts a network of gaming devices and network devices in a gaming establishment that may be used to implement some aspects of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides methods and devices for making, storing and retrieving electronic representations of payment documents. The payment documents may be payment tickets used for gaming machines. For example, the payment documents may be tickets used in cashless ticketing systems such as the EZPay™ gaming payment systems developed by the present assignee. However, the present invention may be used in conjunction with a wide variety of payment documents, including currency and non-currency payment documents.

Some implementations of the present invention sort currency and non-currency payment documents. Some such implementations provide separate receptacles for currency and non-currency payment documents. According to some embodiments, electronic representations are made only of non-currency payment documents. After an electronic representation of a non-currency payment document is made, the payment document is preferably voided, for example by shredding, by heating, by overprinting, by intense illumination, or the like. For example, a heater may blacken a heat-sensitive paper (or similar substrate) or cause the substrate to crumble into bits. Voided non-currency payment documents payment documents may be stored in a non-secure storage area such as a trash receptacle. Moreover, voided non-currency payment documents may be automatically disposed of or may simply be ejected. Voided payment documents from more than one payment validator may be collected into a common storage area, e.g., in a wall or a floor of a gaming establishment near a group of gaming machines.

Some implementations provide devices and methods for resolving payment disputes by reference to stored electronic representations of payment documents. For example, a computer may be used to search a database of stored electronic representations of payment documents for information regarding transactions at a particular gaming machine. The results of the search may be displayed as images and/or text in order to provide a basis for resolving a payment dispute.

Other embodiments read information from a payment document and make an electronic representation of the payment document without retaining the payment document. The payment document may be swiped or otherwise scanned. Some payment documents for use in such implementations include one or more bar codes and/or RFID tags. Voiding information for the payment document is transmitted to, e.g., a host device and/or a gaming machine in order to prevent re-use of the payment document.

FIG. 1 is a simplified block diagram depicting gaming machines within gaming establishment 101. The gaming machines are connected with a dedicated communication network via a host server and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 1, gaming machine 102, and the other gaming machines 130, 132, 134, and 136, include a main cabinet 106 and a top box 104. The main cabinet 106 houses the main gaming elements and can also house peripheral systems, such as those that utilize dedicated gaming networks. The top box 104 may also be used to house these peripheral systems.

The master gaming controller 108 controls the game play on the gaming machine 102 and receives or sends data to various input/output devices 111 on the gaming machine 102. The master gaming controller 108 may also communicate with a display 110.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 108 may also communicate with EFT system 112, bonus system 114, EZPay™ system 116 (a proprietary cashless ticketing system of the present assignee) or a comparable system, and player tracking system 120. The systems of the gaming machine 102 communicate the data onto the network 122 via a communication board 118.

In the present illustration, the gaming machines, 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141.

Further, in some dedicated gaming networks, the DCU 124 can receive data transmitted from the host server 128 for communication to the gaming machines on the gaming network. The received data may be communicated synchronously to the gaming machines on the gaming network. Within a gaming establishment, the gaming machines 102, 130, 132, 134 and 136 are located on the gaming floor for player access while the host server 128 is usually located in another part of gaming establishment 101 (e.g. the backroom), or at another location.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machines 130, 132, 134 and 136 are also connected to the clerk validation terminal 142 and may also receive cashless system services.

Via communication path 149, the gaming machine 102 is connected to a wide area progressive (WAP) device 146. The WAP is connected to a progressive system server 147 that may be used to provide progressive gaming services to the gaming machines. The progressive game services enabled by the progressive game network increase the game playing capabilities of a particular gaming machine by enabling a larger jackpot than would be possible if the gaming machine was operating in a "stand alone" mode. Winning the game being played on a participating gaming machine gives a player a chance to win the progressive jackpot. The potential size of the jackpot increases as the number gaming machines connected in the progressive network is increased. The size of the jackpot tends to increase game play on gaming machines offering a progressive jackpot.

Gaming machines 130, 132, 134 and 136 may also be connected to WAP device 146 and progressive system server 147. Other gaming machines may also be connected to WAP device 146 and/or progressive system server 147. Via communication path 150, the gaming machine 102 may be connected with additional gaming devices (not shown) that provide other gaming services.

In some embodiments of the present invention, gaming machines and other devices in the gaming establishment depicted in FIG. 1 are connected to a central system and/or other gaming establishments via one or more networks, which may be public or private networks. For example, host server 128 and/or progressive system server 147 may be connected to an outside network. In other embodiments, a bingo server, a switch, or another type of network device may be part of an interface with an outside network.

Figure 2A:
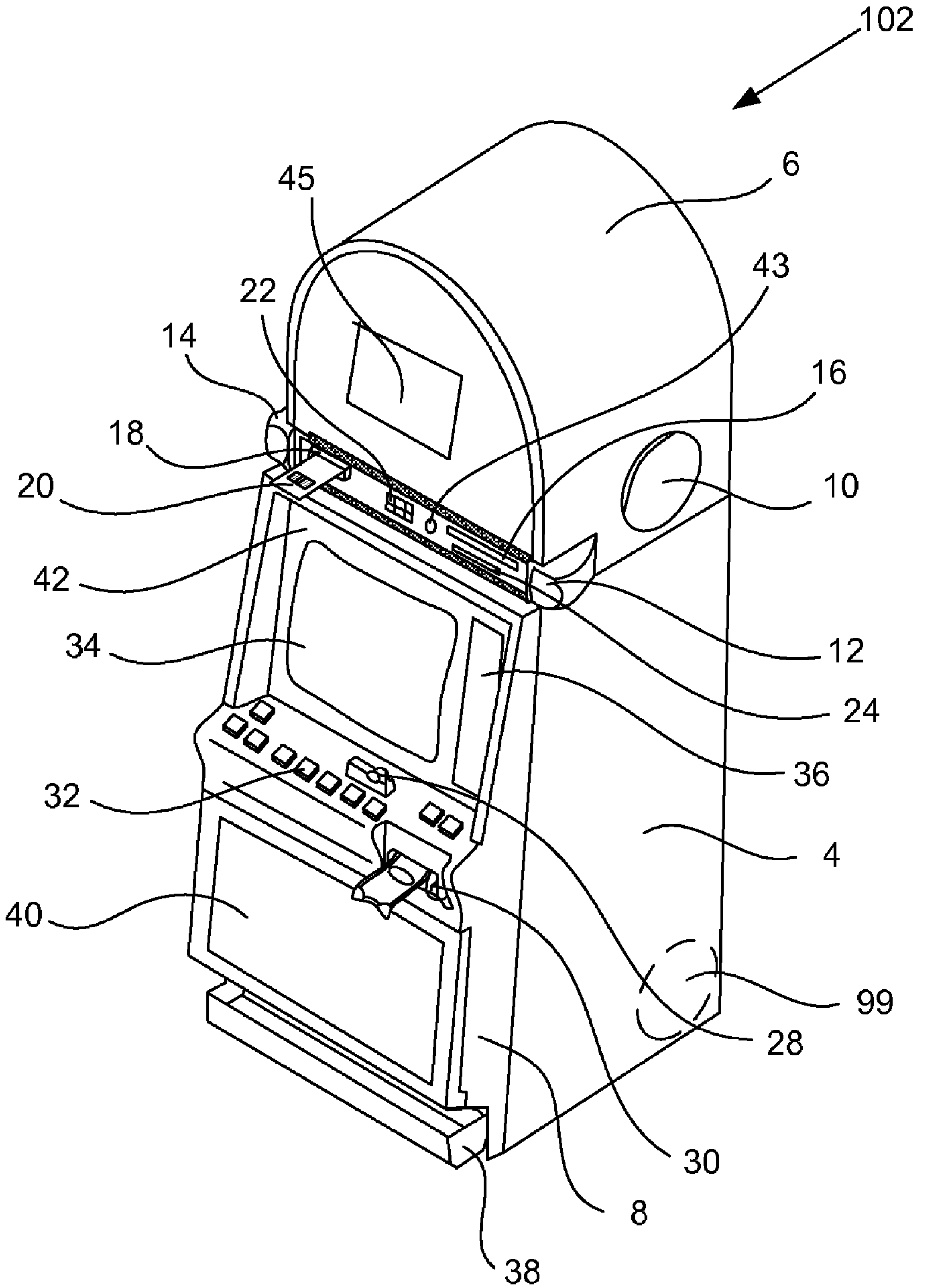
FIG. 2A illustrates a gaming machine that may be used to implement some methods of the present invention.

Turning to FIG. 2A, gaming machine 102 will be further described. Gaming machine 102 is equipped with payment validator 30 and related hardware and/or software necessary to implement aspects of the present invention.

Machine 102 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 102. The devices are controlled by circuitry housed inside the main cabinet 4 of the machine 102.

The gaming machine 102 includes a top box 6, which sits on top of the main cabinet 4. The top box 6 houses a number of devices, which may be used to add features to a game being played on the gaming machine 102, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 102 is but one example from a wide range of gaming machine designs on which the present invention may be implemented (at least in part). For example, not all suitable gaming machines have top boxes or player tracking features. Further, some gaming machines have two or more game displays—mechanical and/or video. Some gaming machines are designed for bar tables and have displays that face upwards. Other gaming machines have an upright configuration and have slanted tops. Still further, some gaming machines may be designed entirely for cashless systems. Such gaming machines may not include such features as validators for currency payment documents, coin acceptors or coin trays. Instead, they may have only ticket readers, card readers (e.g., as described in detail below) and ticket dispensers. Other gaming machines may have payment validators that are not enclosed within main cabinet 4.

As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environments stored on the remote gaming device and to display the rendered image on a display located on the remote gaming device. Those of skill in the art will understand that the present invention can be deployed on virtually any gaming machine now available or hereafter developed.

Returning to the exemplary embodiment of FIG. 2A, when a user wishes to play the gaming machine 102, he or she inserts cash through the coin acceptor 28 or bill validator 30. In addition, the player may use a cashless instrument of some type to register credits on the gaming machine 102. For example, the bill validator 30 may accept a printed ticket voucher, including 20, as an indicium of credit. As another example, the card reader 24 may accept a debit card or a smart card containing cash or credit information that may be used to register credits on the gaming machine.

As set forth in detail below, preferred embodiments of the invention involve making an electronic representation of a payment document and voiding non-currency payment documents. Some embodiments involve separating non-currency payment documents from currency payment documents and routing them along different paths. In some such embodiments, non-currency payment documents are routed to a location outside of the gaming machine, whether by ejecting the non-currency payment documents, by directing the non-currency payment documents to a nearby disposal area, or other wise.

However, some embodiments include a receptacle within the gaming machine (such as receptacle 455, described below with reference to FIGS. 4A and 4B) for collecting voided non-currency payment documents. With some such embodiments, gaming machine 102 also includes port 99 for removing voided non-currency payment documents from gaming machine 102. Port 99 permits access to a receptacle (such as receptacle 455) for removing voided non-currency payment documents by, e.g., a vacuum cleaner or another suitable device without opening another portion of the gaming machine. Preferably, port 99 does not permit access to a cash box or other secured portions of gaming machine 102. Some such embodiments of gaming machine 102 include a sensor for determining how full receptacle 455 is and a display for indicating the fill level. The sensor and display may be of any type known by those of skill in the art and/or described herein.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine.

During certain game functions and events, the gaming machine 102 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 102, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 102. In some embodiments, these tickets may be used by a game player to obtain game services.

Figure 2B:
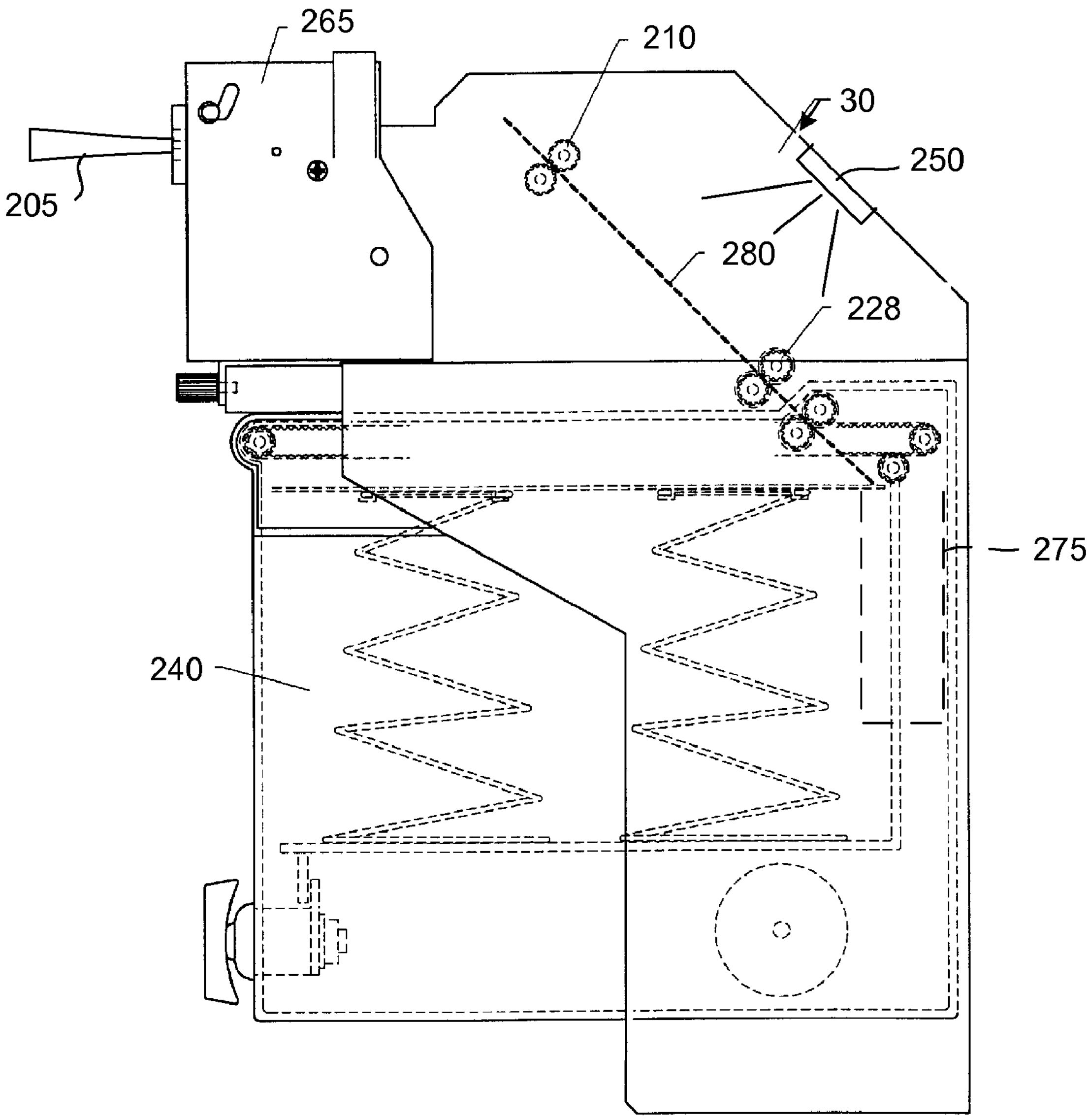
FIG. 2B is a cutaway view of a gaming machine that may be used to implement some methods of the present invention.

FIG. 2B is a cutaway view of one exemplary payment validator according to the present invention. As seen therein, payment validator 30 includes feeder 205, evaluator 265, feed mechanism 280, image-capturing device 250 and payment document stacker 240. In some embodiments of the invention, evaluator 265 may take the form of a conventional validator head for use with currency and non-currency payment documents. However, evaluator 265 has several functions that will vary somewhat in accordance with the requirements of the payment validator of which it is a part. Some functions of evaluator 265 include identifying the denomination of an incoming currency payment document, reading a bar code of a non-currency payment document, validating the payment document to make sure it is not counterfeit, and logging the payment documents received to facilitate an accounting trail.

In addition, some evaluators 265 sort currency and non-currency payment documents and route them to different parts of feed mechanism 280. Some such evaluators route currency to a stacker or other such secure receptacle, but route at least the non-currency payment documents to image capturing device 256 and voider 275.

Image capturing device 256 can include a digital camera, a charged coupled device (CCD) scanner or a similar device. When a payment document is properly positioned by feed mechanism 280, the payment document is illuminated by a photoflash or by another type of light source. The image of the payment document is focused on to an array of photodetectors (i.e., a CCD) and is digitally captured. An electronic representation of the payment document may be transmitted to a host device, such as a server, for storage in a database of such electronic representations.

Voider 275 may be, for example, a shredder, a heater, a printer for overprinting payment documents, or any other suitable type of voiding mechanism. After non-currency payment documents are voided, they may be kept in a non-secure receptacle, may be ejected and returned to the user, or may be disposed of in any convenient way.

In alternative implementations of the invention, some or all of the functions of evaluator 265 may be combined with those of image capturing device 256. For example, image capturing device 256 can be configured to read 1-D and/or 2-D barcodes. When a payment document is properly positioned by feed mechanism 280, the payment document is illuminated by a photoflash or by another type of light source. The images of the dark bars of a bar code (or other symbol) on the payment document will fall on some of the photodetectors, while the light spaces fall on other detectors. An electrical signal is applied to the CCD array and the light value at each detector is read. This signal may be processed to determine the information encoded in the symbol, which may be communicated to an associated gaming machine. U.S. patent application Ser. No. 10/246,373, filed Sep. 16, 2002 and entitled "Player Tracking Communication Mechanisms in a Gaming Machine," is hereby incorporated by reference for all purposes.

With a bright light, the depth of focus for a CCD array is several inches and generally the symbol must be placed closer to the scanner as compared to a laser scanner. However, depending on the size of the symbols, the information may be read up to several feet away. The density of the symbol that can be read is a function of the number of photodetectors in the CCD array. Instead of a CCD scanner, a laser or a CCD video camera may be also be used to read bar-code symbols.

As described above, payment validators have a wide variety of applications. In some applications, such as in the gaming industry, it is highly desirable for the stacker 40 to take the form of a secure box. When the stacker is intended for use as a secure box, it is highly desirable that the housing have a limited number of openings that provide access to the bill stack. It is also desirable that such openings either be lockable or small enough such that is difficult to tamper with the device.

Figure 3:
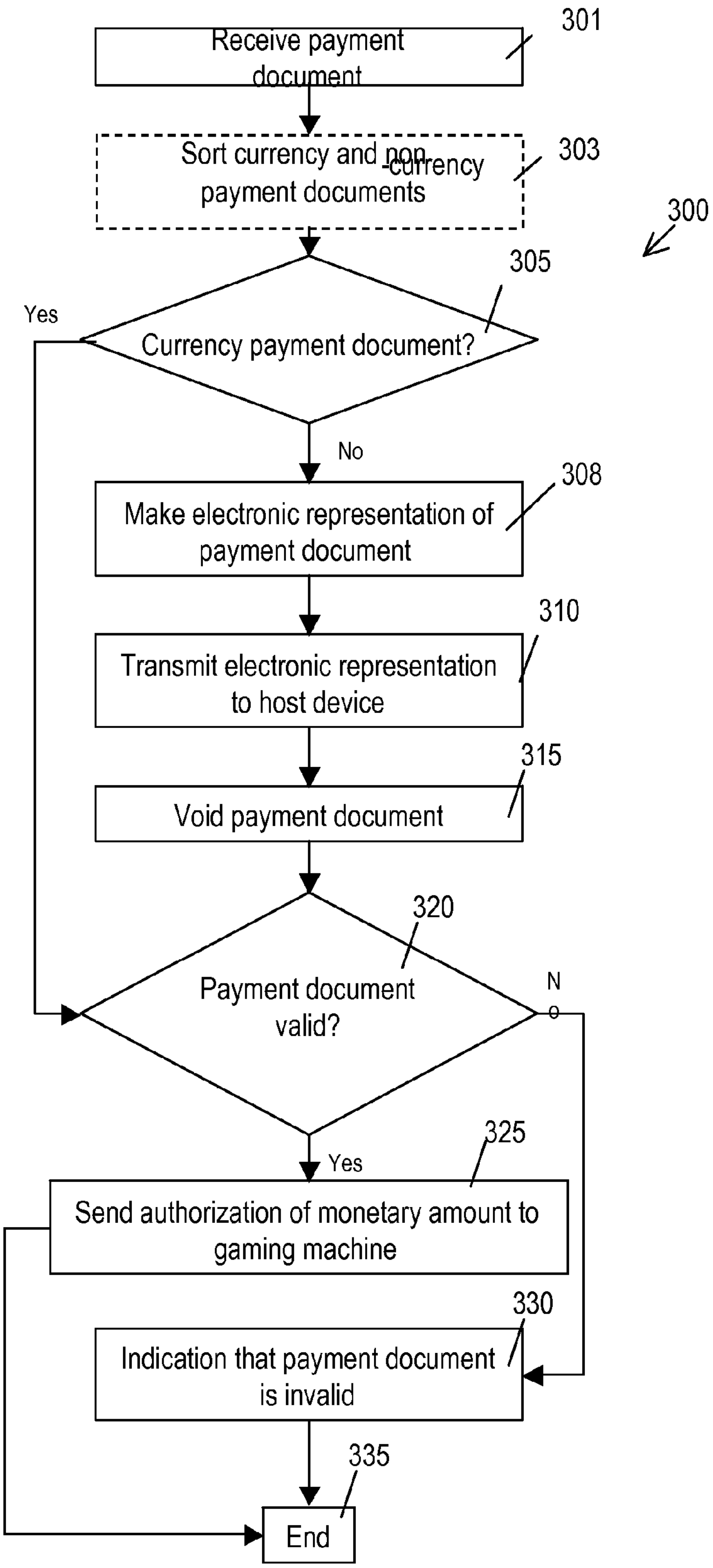
FIG. 3 is a flow chart that outlines an exemplary method of the present invention for processing payment documents.

FIG. 3 is a flow chart that outlines method 300 according to some aspects of the present invention. Method 300 may be advantageously used in connection with payment validators that retain payment documents. As will be appreciated by those of skill in the art, the steps of methods according to the present invention, including method 300, may be performed in a different order and in a different fashion than is shown and described herein, yet the steps will still be within the scope of the present invention.

In step 301, the payment document is received, e.g. by feeder 205 of payment validator 30. In optional step 303, currency and non-currency payment documents are sorted, i.e., physically segregated. If step 303 is implemented, currency and non-currency payment documents may advantageously be treated differently from one another. For example, implementing step 303 allows currency and non-currency payment documents to be stored in different receptacles having different levels of security: currency needs to be stored in a secure receptacle, such as a cash box, that requires special procedures for emptying (e.g., as described above).

Whether or not currency and non-currency payment documents are physically segregated in step 303, in preferred implementations a determination is made of whether a payment document is a currency or a non-currency payment document in step 305. In this implementation of the invention, electronic representations are made only of non-currency payment documents. Moreover, voiding step 315 is not normally applicable to currency payment documents. Therefore, if it is determined in step 305 that the payment document is a currency payment document, the method proceeds to step 320.

However, if it is determined in step 305 that the payment document is a non-currency payment document, an electronic representation is made of the payment document (step 308). The electronic representation is transmitted to a host device (step 310) and stored in a database accessible to the host device. The electronic representation is preferably a digital image of the payment document. However, in some implementations, the electronic representation is of only a portion of the payment document, e.g. a bar code, one or more symbols, a watermark, and/or some other feature that may be used to identify the payment document reliably. In some such implementations, an image is made of the entire payment document, but a logic device in the payment validator or the host device selects a portion of the image to be stored in a database.

In step 315, the payment document is voided. As noted above, it is preferable that currency and non-currency payment documents are segregated prior to the voiding step. If only non-currency payment document are voided, the voiding step may involve a physically destructive process such as tearing, shredding, perforating, grinding, etc. Alternatively, the voiding step may involve heating of heat-sensitive payment documents, overprinting, etc. However, if currency is not separated from non-currency, physically destructive processes are not appropriate. Instead, a less extreme form of voiding should be used, e.g., heating to a temperature that would cause heat-sensitive tickets to be darkened without damaging currency.

In step 320, a determination is made as to whether the payment document is valid. This determination may be made by the payment validator or it may be made by another device, e.g., by the host device. For example, the host device may determine that another identical payment document has already been used and voided. If the payment document is valid, an authorization is sent to an associated gaming machine (step 325). The authorization will commonly be for a monetary amount, although it may be for some other form of credit that is applicable to gaming. If the payment document is not valid, an indication is preferably made to the player (step 330), e.g., by a screen display, by illuminating text near the payment validator, or by any other convenient method.

As noted above, the steps of method 300 may be performed in a different order and in a different fashion shown and described herein, but still will be within the scope of the present invention. For example, some implementations of method 300 determine whether a payment document is valid prior to making an electronic representation, as described below with reference to FIGS. 4A and 4B. In such implementations, an authorization may be sent to a gaming machine before the electronic representation is transmitted to the host device. In alternative implementations, the validity determination may be performed by a host device or verified by the host device. For example, the host device may make this determination based on the electronic representation.

Figure 4A:
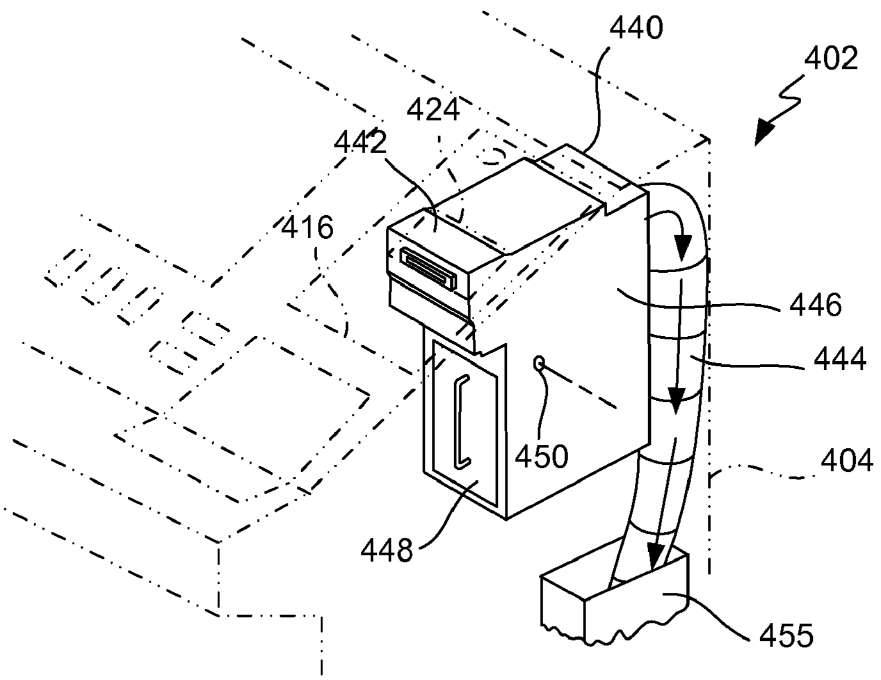
FIGS. 4A and 4B illustrate one exemplary payment validator of the present invention.
Figure 4B:
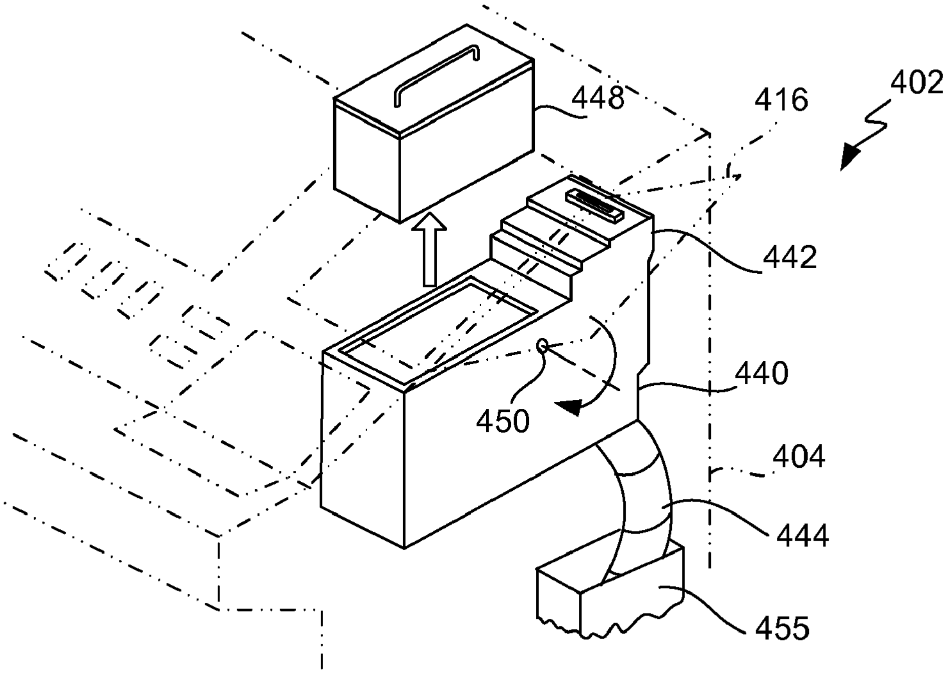

FIGS. 4A and 4B show perspective cut away views of a slant-top gaming machine and a payment validator according to one embodiment of the invention. FIG. 4A illustrates a generally "L-shaped" rotating payment validator 440 in an orientation associated with normal use, referred to herein as the bill insertion position. This rotating payment validator is a modified version of that described in U.S. Pat. No. 5,676,231, entitled "Rotating Bill Acceptor," which is hereby incorporated by reference for all purposes.

In the bill insertion position, evaluator portion 442 of payment validator 440 is located adjacent to the access door 416 such that a bill receptacle on evaluator portion 442 coincides with the position of the bill insertion slot 424 on access door 416. Evaluator portion 442 includes various detectors and associated electronics/logic to optically and/or magnetically verify that payment documents inserted into the gaming machine are indeed valid (i.e., not counterfeit or, in the case of non-currency payment documents, not previously used).

In addition to evaluator portion 442, payment validator 440 also includes transport portion 446 that moves validated currency from the evaluator portion 442 to a cash box 448 where validated bills are stored. In this embodiment, payment validator 440 includes a sorting mechanism that directs currency and non-currency payment documents along different paths. After an electronic representation has been made of non-currency payment documents, they are voided and directed into flexible tube 444 for disposal into receptacle 455. Receptacle 455 may be an enclosed container or may convey voided non-currency payment documents to a disposal area outside of the gaming machine, e.g., in a wall or floor of a gaming establishment. As noted above, in some embodiments receptacle 455 is accessible via port 99, allowing convenient removal of voided payment documents (e.g., by a vacuum cleaner).

The payment validator 440 is pivotally mounted to the interior of machine 402 at two pivot points including arbitrary point 450 shown in FIG. 4A. In some embodiments, a single pivot shaft may be employed off of one side. Note that when payment validator 440 is in the bill insertion position, cash box 448 is located within the gaming machine's interior, away from the access door 416. When cash box 448 is to be removed during a collection cycle, a collection worker first unlocks and opens door 416 to gain access to payment validator 440. At that point, the cash box is still inaccessible.

Thus, the collection worker must rotate payment validator 440 about an axis provided through pivot point 50 so that the bill validator portion 442 tilts to the back of machine 402 and cash box 448 is presented at the doorway as shown in FIG. 4B. This position is referred to herein as the cash removal position (or cash box removal position for those embodiments employing a cash box), and is characterized as being the position in which collection workers can retrieve cash or a cash box from the bill acceptor (as shown by the arrow in FIG. 4B).

Upon rotating the payment validator 440 to the cash box removal position, the collection worker can remove the cash box 448 as shown in FIG. 4B. In preferred embodiments, a lock will be provided to prevent rotation from the bill insertion to the cash removal position. In addition, as an extra or alternative security measure, cash box 448 may be locked to the remainder of bill acceptor 440 so that the only those individuals having the proper key can remove cash box 448. After the collection worker has removed the full cash box 48, he or she will typically replace it with an empty cash box, which will remain in place until the next collection cycle, and will rotate payment validator 440 back to the original insertion position.

Some payment validators of the present invention do not retain non-currency payment documents. Some such payment validators are part of "cashless" systems that do not accept currency, while other such payment validators may be used in conjunction with conventional currency validators and related systems. In some implementations, the payment document is held against a surface, e.g., a clear screen or panel, while the payment document is read and an electronic representation is made.

However, some payment validators do not require physical contact with a payment document. Exemplary payment validators having non-physical contact data interfaces will now be described with reference to FIGS. 5A and 5B. The input mechanisms are provided for illustrative purposes and the present invention is not limited to these two designs. The input mechanisms may be mounted directly to a gaming machine or may be located within a payment validator in communication with the gaming machine.

Figures 5A, 5B:
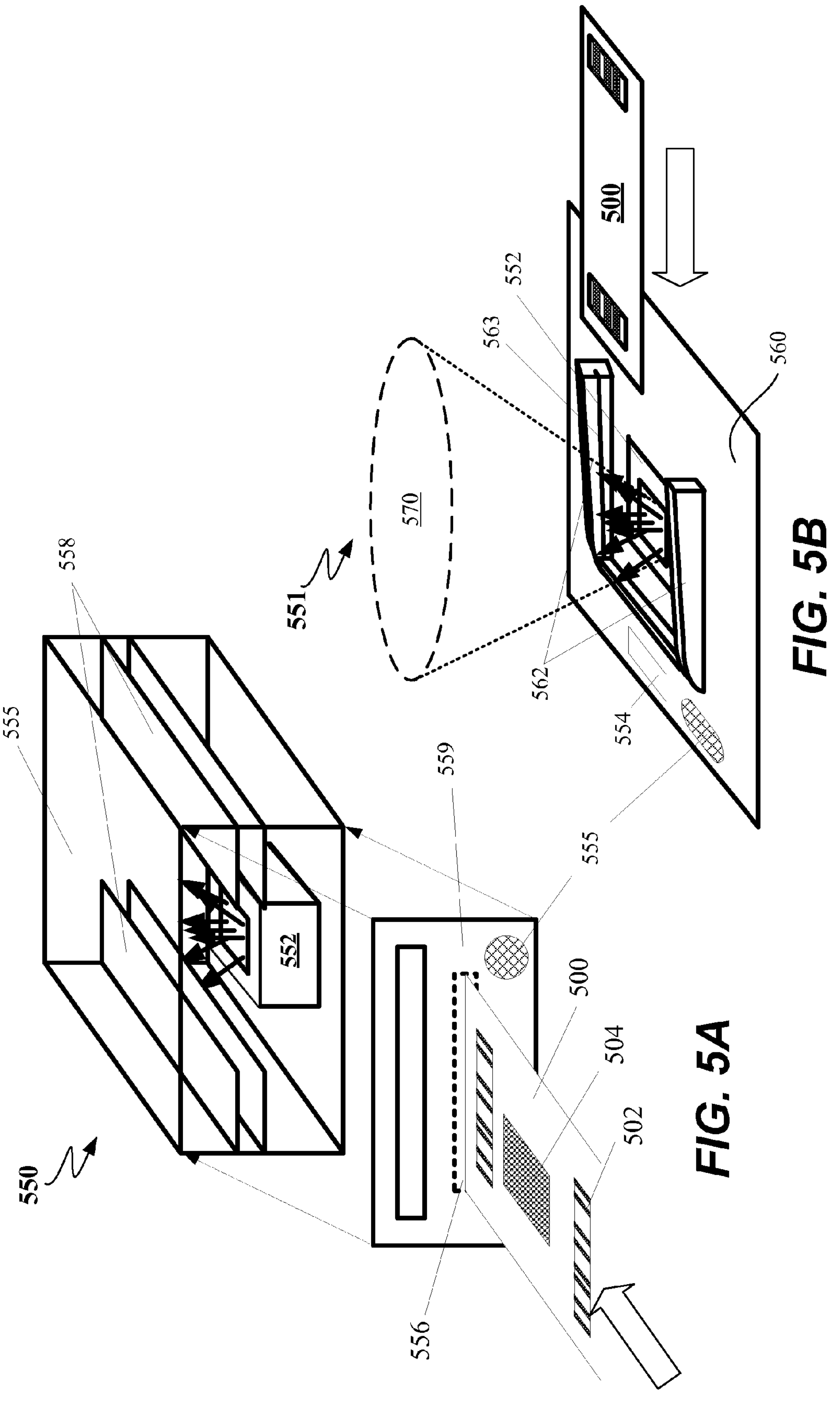
FIGS. 5A and 5B illustrate two exemplary payment validators according to the present invention.

In FIG. 5A, an input mechanism 550 with an interior non-physical contact data interface 552 is shown. The non-physical contact data interface 552 may include an image-capturing device and one of a bar-code scanner, a RFID tag reader and combinations thereof. The input mechanism 550 comprises a rectangular housing 555. The rectangular housing has an exterior surface 559 that is designed to form an exterior surface of the gaming machine. Thus, most of the housing 555 is located within the interior of the gaming machine. The exterior surface 559 may be located on a horizontal surface, a vertical surface or on a surface with an inclination between horizontal and vertical located on the gaming machine.

The housing 555 is designed for accepting payment documents in the form of a rectangular substrate 500, such as a ticket or a plastic card. The substrate 500 may include 1-D bar-codes 502, 2-D bar-codes 504, RFID tags (not shown) and combinations thereof. The exterior surface 559 includes a slot 556. The slot is designed to receive the substrate 500. Guides 558 may be located in the interior of the housing. The guides 558 may be used to constrain the orientation of the substrate 500 after it is inserted in the slot 556. The top of the non-physical contact data interface 552 may be located at a distance below the guides 558. After the substrate 500 is inserted in the slot, information on the substrate may be read by the non-physical contact data interface 552.

In FIG. 5B, an input mechanism 551 with an exterior mounted non-physical contact data interface 552. The top of the non-physical contact data interface 552 is surrounded by an exterior surface 560. The non-physical contact data interface 552 may be mounted below a translucent material. The non-physical contact data interface 552 and the exterior surface by connected to a housing (not shown) extending below the exterior surface 560. The exterior surface 559 may be located on a horizontal surface, a vertical surface or on a surface with an inclination between horizontal and vertical located on the gaming machine.

The non-physical contact data interface may read information from the substrate 500 when it is moved through or within an active volume 570 above the reader 552. The shape and size of the substrate 500 is not limited to a rectangular shape shown in the figure. Information may be read from the substrate 500 at one of a plurality of distances between the substrate 500 and the reader 552 and with one of a plurality of orientations between the substrate 500 and the reader. For example, when bar-code data is read from the substrate 500 using a bar-code reader, the side of the substrate 500 facing the top of the reader 552 may be parallel to the top of the reader or inclined at one of a plurality relative to the top of the reader. Method 600, described below with reference to FIG. 6, assures that a payment document will be in an appropriate position for acquiring an electronic representation of the payment document with the image-capturing device.

When RFID data are read from the substrate 500, in some embodiments, the RFID data may be read independently of the orientation of the substrate relative to the reader 552. In other embodiments, when the RFID tag receives power from the reader 552 via light energy received from photocells on the tag, the substrate may have to be oriented in one of a plurality of orientations that allows the photocells to receive light energy from the reader 552.

During the read process, the substrate 500 may be stationary or at a time varying position relative to the reader 552. Further, the orientation of the substrate relative to the reader 552 during the read process may be fixed or may be time varying during the read process. For example, for a substrate 500 with a 2-D bar-code, the substrate 500 may be moving and changing orientation in the volume above the reader 552 during reading as the reader 552 scans the 2-D bar-code on the substrate a plurality of times.

The input mechanism 551 may optionally include guides 562 for aligning the substrate 500 in a preferred orientation. By placing the substrate 500 within the guides, the substrate 500 may be aligned relative to the reader 552. If the substrate 500 is placed above the guides, but somewhat aligned with the guides or the substrate 500 is smaller than the guides, the substrate may still be sufficiently aligned. In one embodiment, the guides 562 may include slots for inserting the substrate 500.

The input mechanisms 550 and 551 may include a status interface comprising one of a status light 554, a sound projection device 555 and combinations thereof. The status interface may be used to indicate when a payment document is in an appropriate position for the image capturing device to make an electronic representation of the payment document. In some implementations, a logic device evaluates images of a payment document from the image capturing device, determines when the payment document is in a proper position for an electronic representation to be made and controls the status interface to indicate whether or not the payment document is in a proper position. Moreover, the logic device preferably determines whether the captured electronic representation is adequate for the purposes of the present invention. For example, the logic device preferably determines whether the captured electronic representation is adequate for identifying the payment document, e.g., by determining whether a bar code, a symbol, or other identifying information is adequately captured. In general, the sound device 555 and status light 554 may be used to provide information regarding the functioning of the input mechanisms in 550 and 551 in any application for which they are used.

For example a light may be located at any location on the exterior surfaces 559 and 560. For input mechanism 550, the light may be a strip with one or more lighting elements and may surround the slot. For input mechanism, the light may be a strip with one or more lighting elements. Further, the guides 562 may be translucent and back-lit. The sound device 555 may be located on the exterior surfaces 559 and 560. The sound device 555 and status light 554 may be located or at other locations on the gaming machine and are not limited to exterior surfaces 559 and 560.

The status interface may communicate that status information in a number of ways. The sound projection device 555 may emit a sound in response to a data read by the non-physical contact data interface 552 or the lighting device 555 may generate light in response to a data read by the non-physical contact data interface 552. The lighting device 554 may change color in response to a data read by the non-physical contact data interface. For example, the lighting device 554 may generate one of a first color, first light pattern and combinations thereof when a payment document is in a position for an electronic representation to be made and may generate one of a second color, a second light pattern and combinations thereof when payment document is not in a position for an electronic representation to be made.

The status interface may also indicate whether the captured electronic representation is adequate for identifying the payment document. For example, the status interface may instruct a game player to present the payment document for another attempt at making an adequate electronic representation of a payment document. If it is not possible to make an adequate electronic representation of a payment document, the status interface may instruct the player to use another form of payment (if the gaming machine accepts other forms of payment), may instruct the player that no game play is possible at that time, etc.

Figure 5C:
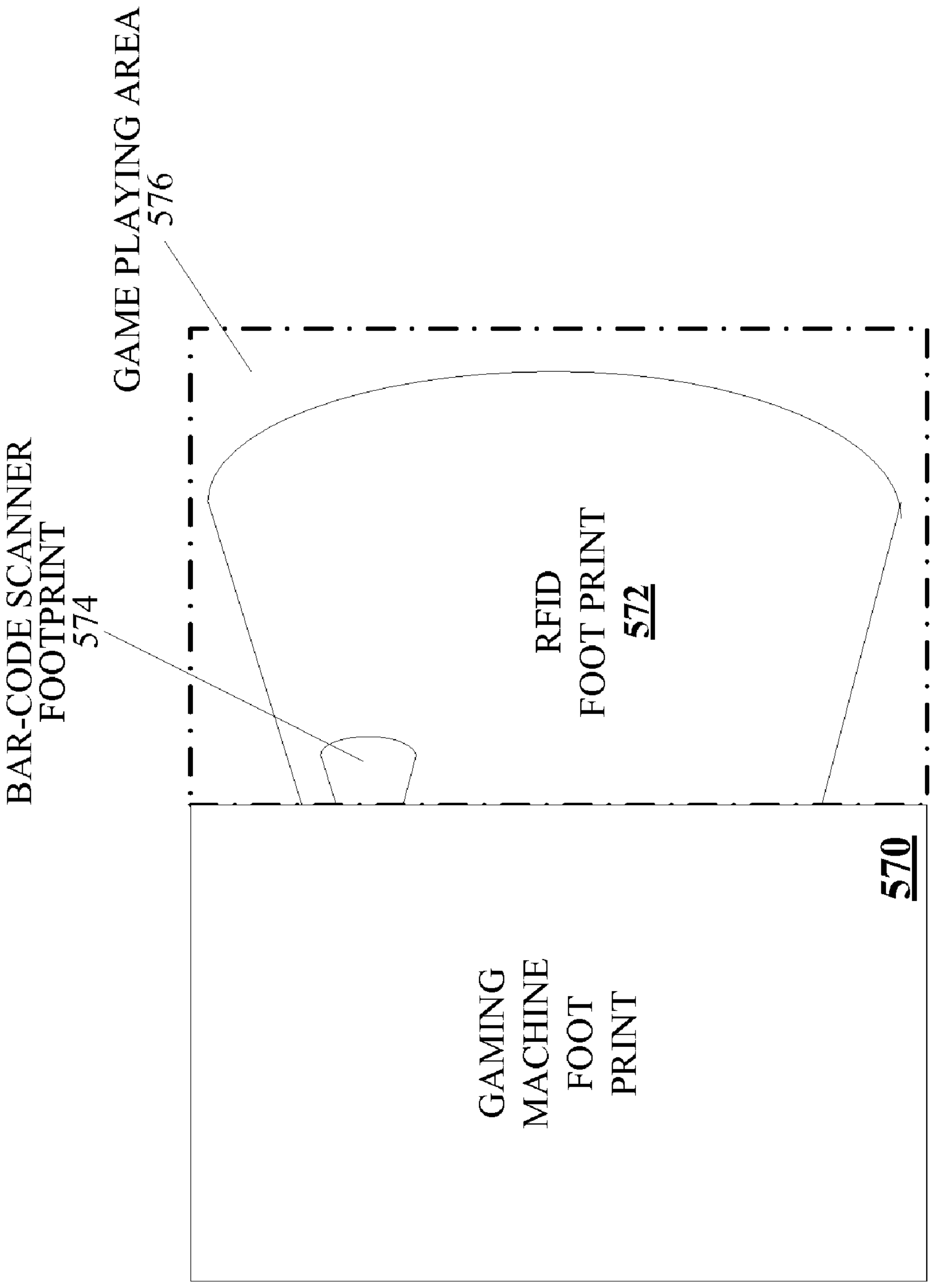
FIG. 5C illustrates footprints of some payment validators according to the present invention.

FIG. 5C is a block diagram of foot prints of non-physical contact data interfaces of the present invention. The gaming machine typically occupies a foot-print 570 while the gaming machine is on the casino floor. The foot print is the area on the casino floor occupied by the gaming machine which may vary according to the make and model of the gaming machine. To play the gaming machine, a player typically stands or sits within a game player area 576 in front of the gaming machine. To read bar-code data, a substrate with the bar-code is placed within an active volume of space in which the bar-code reader is operable to read data. A foot print 574 for the active volume of the bar-code reader is shown. The active volume is typically located at a location on the gaming machine that is easily accessible to the player that is located within the game playing area 576.

An RFID tag reader may generate an active volume with a much larger foot print than a bar-code reader. In one embodiment, the foot print of the active volume for an RFID tag reader may encompass all or a large portion of the game playing area 576. The RFID tag reader may be designed to read all of the RFID tags located within its active volume. A foot print 572 for one active volume of an RFID tag reader is shown in the figure. For the foot print 572, when a player carrying RFID tags is located within the game playing area 576, then the RFID tag reader may be able to read the RFID tags carried by the player.

The active volume of the RFID tag reader may be sized to prevent overlapping reads. To minimize overlapping reads, the active volume of the RFID tag reader may be shaped. The active volume may be shaped by among other factors, the size of the antenna used with the reader, the power supplied to the antenna and the frequency used to read the RFID tags. Further, shielding may be built into the cabinet of the gaming machine to limit the active volume of the RFID tag reader. For instance, shielding may be provided to prevent the active volume from extending behind the gaming machine or to the sides of the gaming machine.

Dynamically changing the active volume may be used to locate RFID tags closest to an RFID reader. For instance, if the active volume of the reader is such that a plurality of different RFID tags carried by different players are read by the reader, then the signal strength supplied to the reader antenna may be reduced such that only the RFID tags closest to the RFID reader receive enough power to reply to the RFID reader. Thus, only the RFID tag for a player located proximate to the front of the gaming machine may be read as the power supplied to the reader antenna is reduced. This approach may be applied when it is desirable to eliminate overlapping reads.

Figure 6:
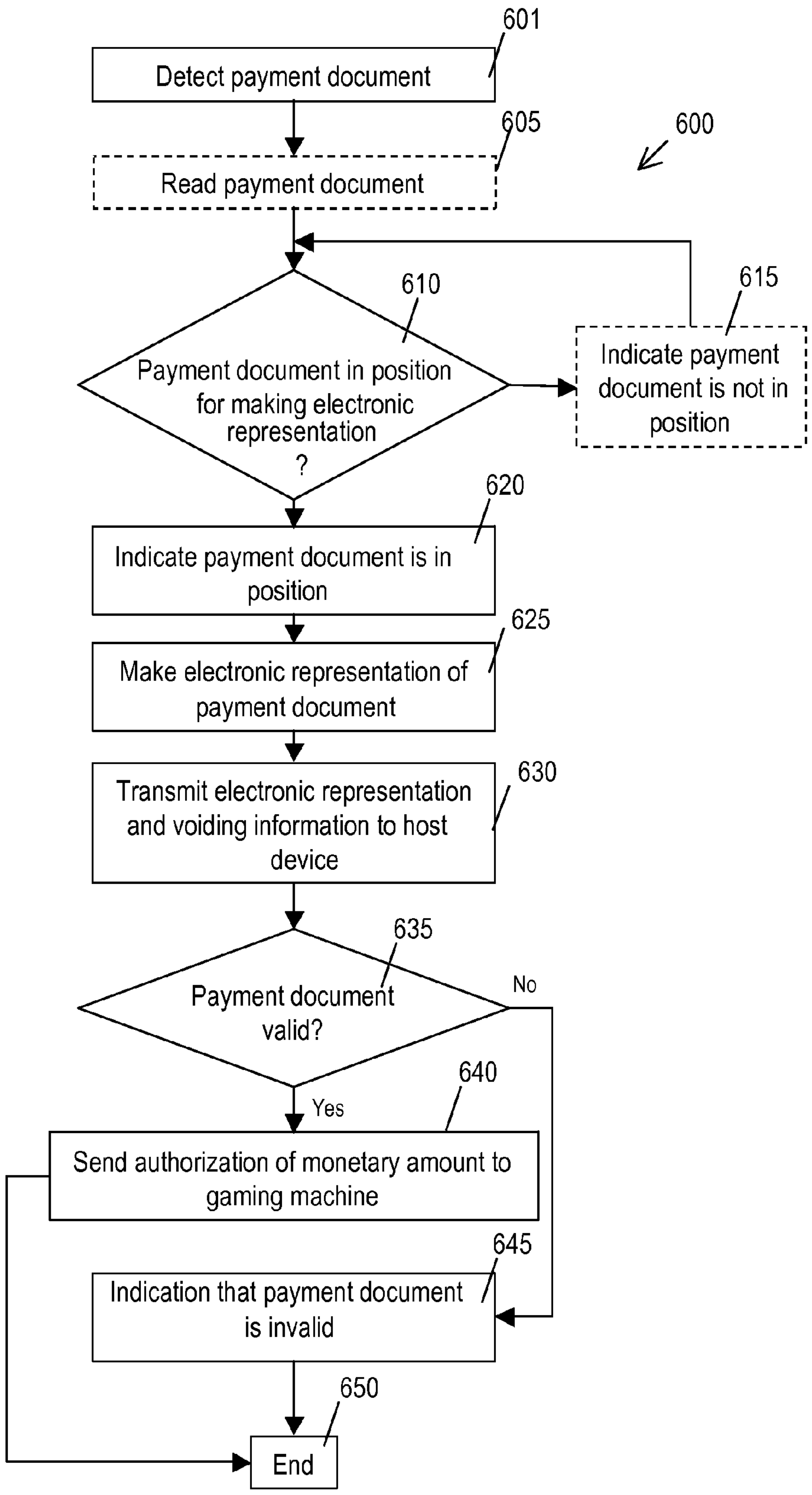
FIG. 6 is a flow chart that outlines an alternative method of the present invention for processing payment documents.

FIG. 6 is a flow chart that outlines steps of method 600 according to the present invention. Method 600 is particularly advantageous when used with payment validators that do not retain payment documents, e.g., those described above with reference to FIGS. 5A-5C. In step 601, a payment document is detected by the payment validator and in step 605 the payment document is read. Step 601 occurs when the payment document is brought within a footprint of a reader. In the case of a payment document having a bar code, the payment document may need to be oriented within a required range of angles with respect to the reader.

Even though the payment document has been read, the payment document may not yet have been properly positioned for making an electronic representation. Therefore, method 600 includes the step of determining whether the payment document is in a proper position for having its electronic representation made. If not, in optional step 615, an indication is made to a player that the payment document is not in a proper position (e.g., by a status interface as described above). In some implementations, an indication is only made when the payment document is in position (step 620). In step 625, the electronic representation is made and in step 630 the electronic representation is sent to a host device for storage in a database. In some implementations, voiding information is transmitted along with the electronic representation. The voiding information may include information read from the payment document and may also include the time, gaming machine ID, and/or other pertinent information for identifying the payment document to be voided.

In step 635, it is determined whether the payment document is valid. This determination may be made by the payment validator or it may be made by another device, e.g., by the host device. The host device may determine, for example, that another identical payment document has already been used and voided and will send information to the payment validator indicating that the payment document is invalid. If the payment document is not valid, an indication is preferably made to the player (step 645), e.g., by a screen display, by illuminating text near the payment validator, via a status interface such as that described above, or by any other convenient method.

However, if the payment document is valid, an authorization is sent to an associated gaming machine (step 640). The authorization will commonly be for a monetary amount, although it may be for some other form of credit that is applicable to gaming.

The steps of method 600 may be performed in a different order and in a different fashion shown and described herein, but still will be within the scope of the present invention. For example, the validity determination of step 635 may be made earlier in the process, e.g., before an electronic representation is sent to the host device. However, it is preferable at least to make the electronic representation and to transmit the voiding information prior to authorizing credit on the gaming machine. Otherwise, there is a higher risk of having a payment used more than once, or of having difficulty resolving a potential dispute regarding the payment document.

Figure 7:
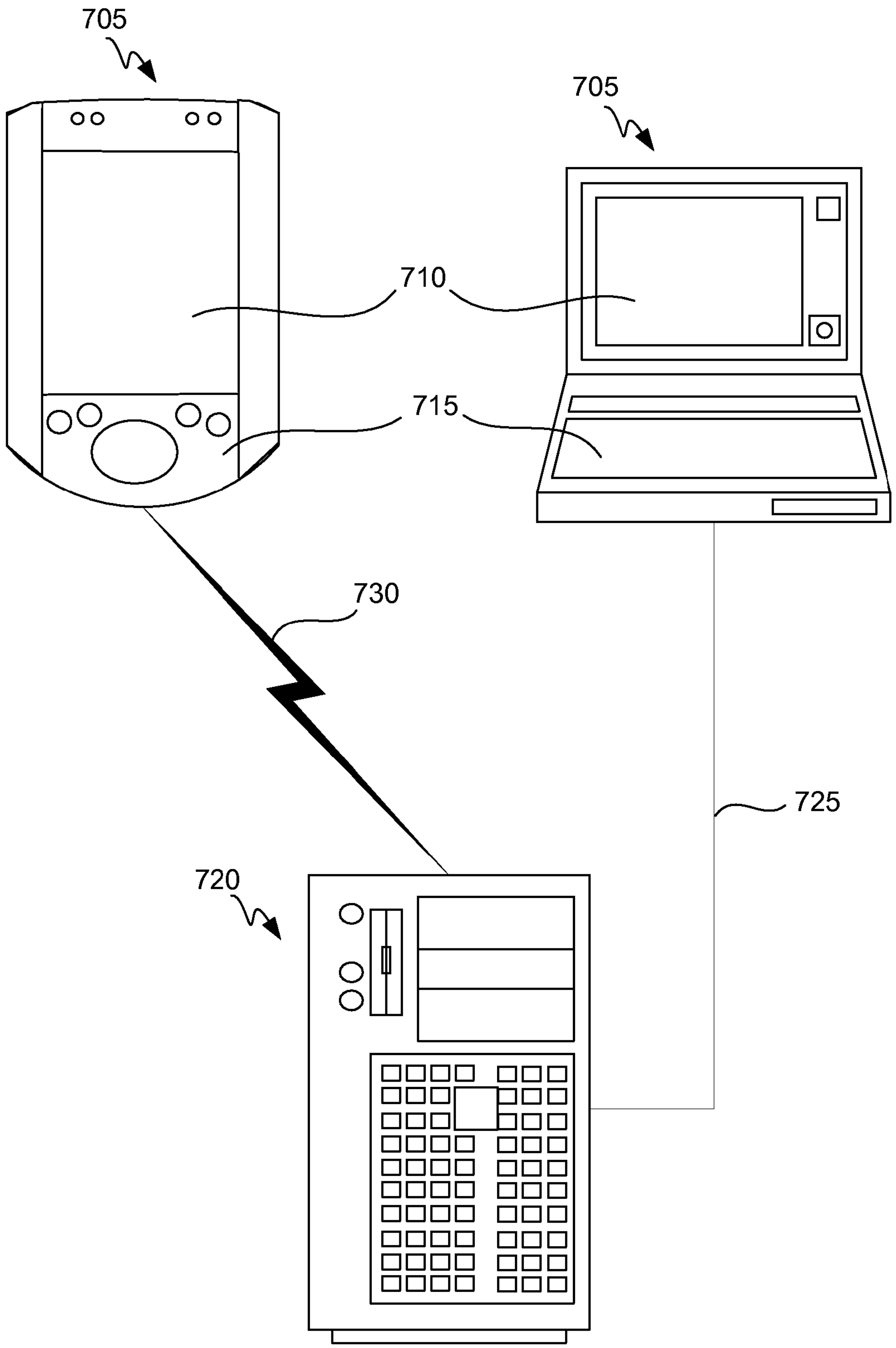
FIG. 7 illustrates devices that may be used for implementing methods for resolving payment disputes according to some aspects of the present invention.

FIG. 7 indicates some devices that may be used for resolving payment disputes according to some implementations of the invention. Some exemplary methods for resolving payment disputes will be discussed below with reference to FIG. 8. Computer 705 may be any convenient type of computing device, including a desktop computer, a hand held device, a laptop computer, etc. Computer 705 includes a display 710 and an input device such as a keyboard, a mouse pad, or any other input device known in the art. Computer 705 is configured for communication with a host device 720, which has access to a database of electronic representations of payment documents. Computer 705 may communicate with host device 720 by a wired connection 725 or a wireless connection 730.

Figure 8:
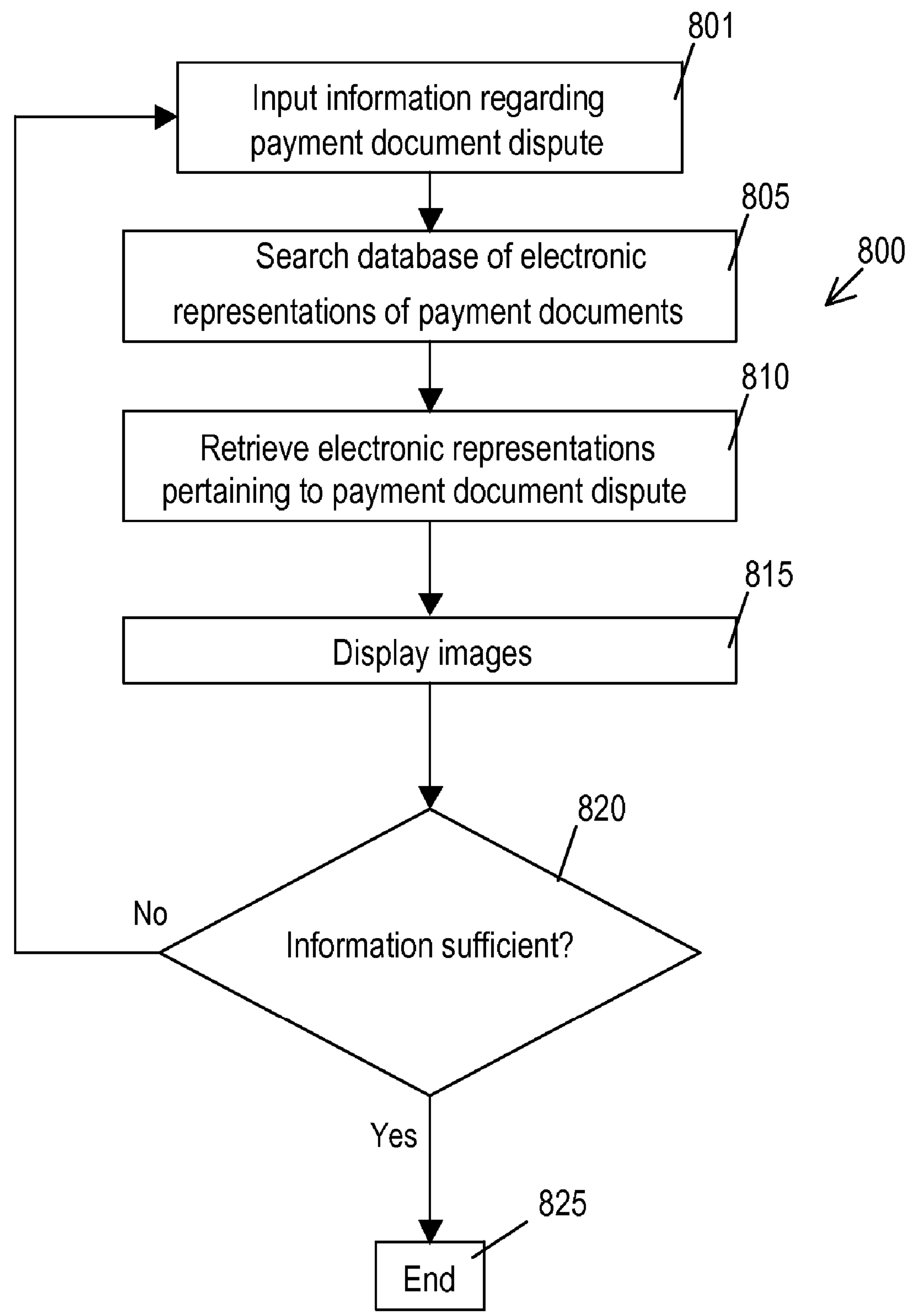
FIG. 8 is a flow chart that outlines an exemplary method for resolving payment disputes according to one aspect of the present invention.

FIG. 8 outlines the steps of method 800 for resolving payment disputes according to some aspects of the invention. In step 801, information is input (e.g., on a keyboard of computer 705) regarding a payment document dispute. The information may include, for example, a gaming machine ID and a time range during which the incident underlying the payment dispute allegedly took place.

In step 805, a database of electronic representations of payment documents is searched. In preferred embodiments of the invention, time and gaming machine ID information is associated with all electronic representations in the database. In some implementations, other information is stored, e.g., information that has been read from a code or symbol on the payment document. This information allows, e.g., host device 720 to retrieve the desired information and send it to computer 705.

The relevant images are then displayed (step 815). Depending on the number of requested images, the size of the screen, etc., some or all of the images may be displayed at one time. Hopefully, it is possible to identify the disputed payment document and resolve the dispute. If not, another search may be attempted until enough information is retrieved to resolve the payment dispute.

Although the foregoing invention has been described in some detail for purposes of clarity of understanding, it will be apparent that certain changes and modifications may be practiced within the scope of the appended claims. For instance, in alternative embodiments, the payment validator or the gaming machine may perform the dispute resolution functions described herein as being performed by computer 705. Moreover, the payment validator of the present invention may be used with any of a number of machines that (1) provide credit to a user when the user inserts a payment document, and (2) dispense goods or services when the user issues appropriate instructions. By way of example, the host machine may be a vending machine such as a soda machine, a candy machine, or a cigarette machine, or an arcade game such as a video arcade game.

We claim:

1. An apparatus, comprising:

an image-capturing device configured for making an electronic representation of at least a portion of a payment document;

an evaluator configured to do the following:

sort currency and non-currency payment documents;

route at least the non-currency payment documents to the image capturing device, wherein at least one of the image-capturing device and the evaluator is configured to cause an electronic representation of a non-currency payment document to be transmitted to a host device;

route currency payment documents to a secure receptacle;

receive validation information from the host device; and determine, according to the validation information from the host device, whether the non-currency payment document is valid; and a voider configured for voiding non-currency payment documents by physical destruction, heating, overprinting, or illumination;

wherein the evaluator is further configured for transmitting, to a wager gaming machine, an authorization of a specific monetary amount that may be used for gaming on the wager gaming machine.

2. The apparatus of claim 1, further comprising a reader configured for reading payment document information, wherein at least one of the image-capturing device and the evaluator is further configured to cause payment document information read from the non-currency payment document to be transmitted to the host device.

3. The apparatus of claim 1, wherein the image-capturing device is configured for making an electronic representation of at least a portion of a currency payment document.

4. The apparatus of claim 1, wherein the evaluator is further configured for determining whether a currency payment document is valid.

5. The apparatus of claim 1, wherein the reader comprises at least one of a bar code reader and a radio frequency identification ("RFID") reader.

6. The apparatus of claim 1, wherein the evaluator includes the image-capturing device.

7. The apparatus of claim 2, wherein the payment document information comprises at least one of bar code data, radio frequency identification ("RFID") tag data, magnetic data and watermark data.

8. The apparatus of claim 1, wherein the evaluator is further configured to route a non-currency payment document to the voider after the image-capturing device makes an electronic representation of at least a portion of the non-currency payment document.

9. The apparatus of claim 8, wherein the voider is further configured to route voided non-currency payment documents to a non-secure location.

10. A method, comprising:

receiving payment documents;

sorting currency and non-currency payment documents;

making an electronic representation of at least a portion of a non-currency payment document, the electronic representation comprising an electronic image;

transmitting the electronic representation to a host device;

routing currency payment documents to a secure receptacle;

receiving validation information from the host device; and determining, according to the validation information from the host device, whether the non-currency payment document is valid; and voiding-non-currency payment documents by physical destruction, heating, overprinting, or illumination; and transmitting, to a wager gaming machine, an authorization of a specific monetary amount that may be used for gaming on the wager gaming machine.

11. The method of claim 10, wherein the making comprises reading payment document information from the non-currency payment document and wherein the transmitting comprises transmitting the payment document information to the host device.

12. The method of claim 10, further comprising making an electronic representation of at least a portion of a currency payment document.

13. The method of claim 10, further comprising determining whether a currency payment document is valid.

14. The method of claim 11, wherein reading comprises reading the non-currency payment document with at least one of a bar code reader and a radio frequency identification ("RFID") reader.

15. The method of claim 11, wherein the payment document information comprises at least one of bar code data, radio frequency identification ("RFID") tag data, magnetic data and watermark data.

16. The method of claim 10, further comprising routing voided non-currency payment documents to a non-secure location.

17. A method, comprising:

receiving payment documents;

separating a currency payment document from a non-currency payment document;

routing the currency payment document to a secure receptacle;

making an electronic representation of at least a portion of the non-currency payment document;

transmitting the electronic representation to a host device;

receiving validation information from the host device;

voiding the non-currency payment document by physical destruction, heating, overprinting, or illumination;

routing the non-currency payment document to a non-secure receptacle; and determining, according to the validation information from the host device, whether the non-currency payment document is valid; and transmitting, to a wager gaming machine, an authorization of a specific monetary amount that may be used for gaming on the wager gaming machine.

18. The method of claim 17, wherein the making comprises reading payment document information from the non-currency payment document and wherein the transmitting comprises transmitting at least some of the payment document information to the host device.

* * * * *